US012421908B1

(12) United States Patent
Anders et al.

(10) Patent No.: US 12,421,908 B1
(45) Date of Patent: Sep. 23, 2025

(54) SYSTEMS AND METHODS FOR ACTIVELY MANAGING PILOT FUEL STORAGE TANKS

(71) Applicant: Caterpillar Inc., Peoria, IL (US)

(72) Inventors: Jonathan W. Anders, Peoria, IL (US); David Mark Ginter, Peoria, IL (US); Kenth I. Svensson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/653,783

(22) Filed: May 2, 2024

(51) Int. Cl.

| | |
|---|---|
| ***F02D 19/06*** | (2006.01) |
| ***F02D 19/02*** | (2006.01) |
| ***F02M 31/02*** | (2019.01) |

(52) U.S. Cl.
CPC ....... *F02D 19/0642* (2013.01); *F02D 19/023* (2013.01); *F02D 19/0607* (2013.01); *F02D 19/0665* (2013.01); *F02D 19/0668* (2013.01); *F02D 19/0678* (2013.01); *F02D 19/0684* (2013.01); *F02M 31/02* (2013.01)

(58) Field of Classification Search
CPC ............... F02D 19/0642; F02D 19/023; F02D 19/0607; F02D 19/0665; F02D 19/0668; F02D 19/0678; F02D 19/0684; F02M 31/02
See application file for complete search history.

(56) References Cited

U.S. PATENT DOCUMENTS

| | | | | |
|---|---|---|---|---|
| 7,293,552 B2 | | 11/2007 | Leone | |
| 7,337,754 B2 | | 3/2008 | Dearth | |
| 8,141,356 B2 | | 3/2012 | Leone | |
| 9,074,562 B2 | | 7/2015 | Tsutsumi | |
| 9,803,563 B2 | | 10/2017 | Kudo | |
| 12,006,886 B1 | * | 6/2024 | Lohrisch | F02D 19/0663 |
| 2023/0070006 A1 | * | 3/2023 | Montgomery | F02M 21/0227 |

FOREIGN PATENT DOCUMENTS

| | | | | |
|---|---|---|---|---|
| CN | 104010915 B | * | 3/2018 | B60K 15/07 |
| EP | 4108564 A1 | | 12/2022 | |
| JP | 4858422 B2 | | 6/2009 | |

OTHER PUBLICATIONS

Machine Translation of CN 104010915 B PDF File Name: "CN 104010915B_Machine_Translation.pdf" (Year: 2018).*

* cited by examiner

*Primary Examiner* — Lindsay M Low
*Assistant Examiner* — Ruben Picon-Feliciano
(74) *Attorney, Agent, or Firm* — Lee & Hayes, P.C.

(57) ABSTRACT

An internal combustion engine system is described herein. The system uses a pilot fuel to assist in the ignition of the primary fuel or uses a pilot fuel rather than a primary fuel in some instances. The pilot fuel is stored in one or more pilot fuel storage tanks that are actively managed to maintain a desired physical state of the pilot fuel stored in the one or more storage tanks. A controller detects conditions within the one or more pilot fuel storage tanks and issues control commands depending on the detected conditions. The conditions can include a temperature, a pressure, or a level of the pilot fuel stored in the pilot fuel storage tanks.

16 Claims, 5 Drawing Sheets

SYSTEMS AND METHODS FOR ACTIVELY MANAGING PILOT FUEL STORAGE TANKS

TECHNICAL FIELD

The present disclosure relates generally to operating a prime mover, and more particularly, to actively managing one or more storage tanks used to store dimethyl ether for use by the prime mover.

BACKGROUND

Work machine prime movers, such as internal combustion engines, fuel cells, batteries, and the like, are widely used in various industries. Internal combustion engines, for example, can operate using a variety of different liquid fuels, gaseous fuels, and various blends. Spark-ignited engines employ an electrical spark to initiate combustion of fuel and air, whereas compression ignition engines typically compress gases in a cylinder to an autoignition threshold such that ignition of fuel begins without requiring a spark. As part of the effort to improve the efficiency of these engines and reduce emissions, researchers have explored various types of alternate fuel mixtures, including alcohol fuels like methanol, ethanol, and other chemicals. In some examples, methanol is directly injected into an engine cylinder and the methanol is ignited with a pilot fuel or a spark. The use of methanol can provide various benefits over other alternative fuels. In some instances, a pilot fuel may be needed to assist in the ignition of the methanol. Some systems use dimethyl ether (DME) as a pilot fuel. This DME can be generated for use or stored in a tank. The state of the DME in the tank can change depending on the tank's temperature and pressure. Changes in tank conditions over time can have unwanted effects on the DME.

Some efforts have been made to store one or more fuels for combustion engines. For example, U.S. Pat. No. 8,141,356 to Leone and Stein ("the '356 patent") describes a system that separates a blended fuel containing alcohol and gasoline and supplies the separated fuel to an engine. The system of the '356 patent uses a separator that separates the fuel into the alcohol and gasoline, providing for a dual-fuel engine. The separator of the '356 patent is adjusted based on the power needs of the engine. However, the system described in the '356 patent can be limited in its use, as the system does not provide for the management of the storage of excess, separated fuel for future use, as the separated fuel is used by the engine. As a result of the configuration described above, the system described in the '356 patent may be limited in use because of the lack of ability to store excess DME, the lack of ability to manage the separated fuel, or provide the separated fuel for a startup operation.

Examples of the present disclosure are directed to overcoming deficiencies of such systems.

SUMMARY

In one aspect of the present disclosure, a system includes an internal combustion engine that consumes a primary fuel and a pilot fuel, a primary fuel tank providing the primary fuel to a primary fuel rail for use by the internal combustion engine, a pilot fuel system configured to generate the pilot fuel from the primary fuel, the pilot fuel system including a reactor that receives the primary fuel, the reactor configured to convert the primary fuel from an alcohol to an ether, wherein a product of the reactor comprises the pilot fuel, unreacted primary fuel, and water, and a product pump that receives the pilot fuel from the reactor and pumps the pilot fuel into the internal combustion engine or one or more pilot fuel storage tanks for use by the internal combustion engine, and a controller configured to actively manage a physical state of the pilot fuel stored in the one or more pilot fuel storage tanks, the controller comprising a memory storing computer-executable instructions, and a processor in communication with the memory, the computer-executable instructions causing the processor to perform acts comprising receiving a storage condition of the one or more pilot fuel storage tanks determining if the storage condition of the one or more pilot fuel storage tanks is within a range, and upon determining that the storage condition is not within the range, issuing a control output to bring the storage condition to within the range.

In another aspect of the present disclosure, a controller is configured to actively manage a physical state of a pilot fuel for an internal combustion engine, the pilot fuel produced in a reactor from a primary fuel used for the internal combustion engine, the controller comprising a memory storing computer-executable instructions, and a processor in communication with the memory, the computer-executable instructions causing the processor to perform acts comprising receiving a storage condition of one or more pilot fuel storage tanks used to store the pilot fuel, determining if the storage condition of the one or more pilot fuel storage tanks is within a range, and upon determining that the storage condition is not within the range, issuing a control output to bring the storage condition to within the range.

In a still further aspect of the present disclosure, a method for actively managing a physical state of a pilot fuel for use by an internal combustion engine includes receiving a storage condition of one or more pilot fuel storage tanks used to store the pilot fuel, determining if the storage condition of the one or more pilot fuel storage tanks is within a range, and upon determining that the storage condition is not within the range, issuing a control output to bring the storage condition to within the range.

DETAILED DESCRIPTION

Wherever possible, the same reference numbers will be used throughout the drawings to refer to same or like parts.

Figure 1:
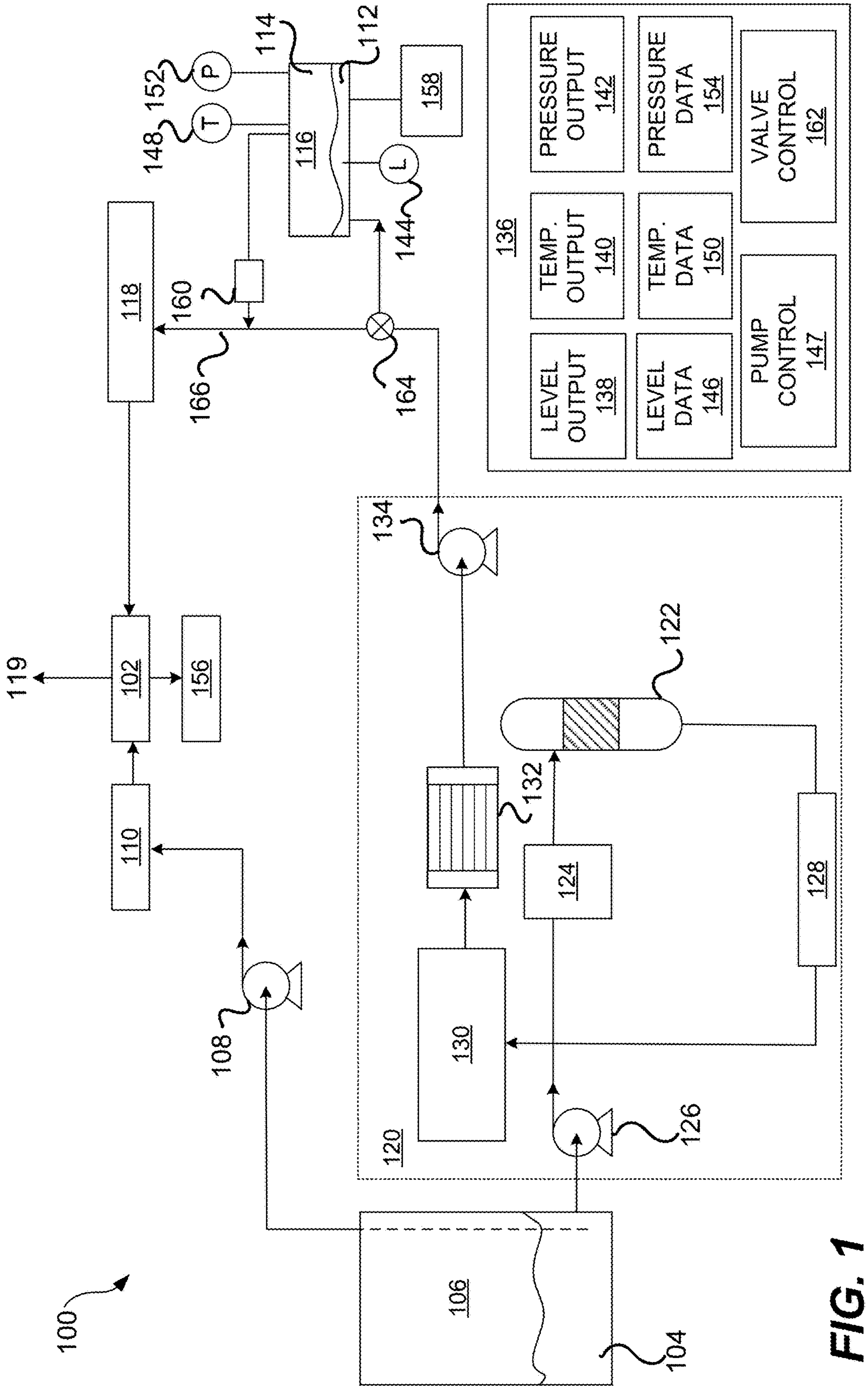
FIG. 1 is a schematic illustration of a system, including an internal combustion engine that creates pilot fuel from a primary fuel, whereby a portion of the pilot fuel is stored in one or more tanks actively managed by a controller, in accordance with one or more examples of the present disclosure.

Referring to FIG. 1, there is shown a combustion engine system 100 that creates a pilot fuel using a primary fuel as a source for the pilot fuel, in accordance with one or more examples of the present disclosure. The system 100 includes an engine 102. As used herein, the engine 102 is a type of prime mover that may be used separately from, or in conjunction with, other systems such as batteries, fuel cells, and the like. The engine 102 is an internal combustion engine fueled by and consumes a primary fuel 104 stored in a primary fuel tank 106. The primary fuel 104 may include an alcohol fuel such as methanol or ethanol, for example, or other fuel types (e.g., diesel fuel, gasoline, liquid natural gas, etc.). For the purposes of illustrating an example of the presently disclosed subject matter, the primary fuel 104 is methanol. The primary fuel 104 is pumped using a primary fuel pump 108 into a primary fuel rail 110 for use by the engine 102. As used herein, a "rail" is a fuel line that supplies fuel to injectors (not shown) of the engine 102. It should be noted that the presently disclosed subject matter is not limited to the use of fuel rails.

In some examples, the primary fuel 104 is a relatively lower cetane/higher octane type of fuel that, in the configuration illustrated in FIG. 1, uses a pilot fuel, such as a liquid pilot fuel 112, which is the liquid portion of the reactor product 128, or a gaseous pilot fuel 114, which is the vapor or gaseous portion of the reactor product 128, (collectively referred to herein as "the pilot fuel 112/114"). It should be noted that although the term "pilot fuel" is used for FIG. 1, in some configurations, the pilot fuel 112/114 may be used in lieu of the primary fuel 104. The pilot fuel 112/114 is stored in a storage tank 116 and provided through a pilot fuel rail 118 to cause the ignition of the primary fuel 104 producing an exhaust 119. The liquid pilot fuel 112 or the gaseous pilot fuel 114 may include a higher cetane/lower octane liquid fuel, and the primary fuel 104 may include a lower cetane/higher octane liquid fuel. The terms "higher" and "lower" in this context may be understood as relative terms in relation to one another. Thus, the liquid pilot fuel 112 or the gaseous pilot fuel 114 may have a higher cetane number and a lower octane number than a cetane number and an octane number of the primary fuel 104. The liquid pilot fuel 112 or the gaseous pilot fuel 114 may not be a single component, but rather, may include other components. For example, the liquid pilot fuel 112 may be produced from methanol and includes dimethyl ether (DME), water, and unreacted methanol. The gaseous pilot fuel 114 may be primarily DME but may contain other components, such as carbon dioxide/monoxide and other gases.

In the system 100 of FIG. 1, the pilot fuel is produced by converting a portion of the primary fuel 104 into the pilot fuel using a pilot fuel system 120. Thus, while the primary fuel tank 106 stores the primary fuel 104 for use by the engine 102, the primary fuel tank 106 also stores fuel to produce the pilot fuel used by the engine 102. To produce the pilot fuel in the example of FIG. 1, the primary fuel 104 undergoes a dehydration reaction in reactor 122 according to the following chemical reaction (1):

$$2CH3OH \leftrightarrow CH3OCH3+H2O; \quad (1)$$

where 2CH3OH is methanol, CH3OCH3 is dimethyl ether (DME), and H2O is water. The reactor 122, which is a methanol dehydration reactor, can be one of various types of reactors, having various types of catalysts, capable of dehydrating the methanol to DME. Some catalysts include, but are not limited to, aluminum oxide, zeolite, titanium oxide, and barium oxide. The reaction temperature within the reactor 122 can vary depending on flowrate and the catalyst used, with temperatures ranging from 200° C. to 400° C. Because the dehydration reaction provided above is an exothermic equilibrium equation, it follows that from a thermodynamic point of view high degrees of conversion are achieved at reaction temperatures as low as possible. However, a minimal temperature is typically needed from a reaction-kinetic point of view in order to ensure sufficient reaction rates and thus acceptable DME conversion rates.

To increase the temperature of the incoming primary fuel 104, heater 124 may be used for heating the incoming primary fuel 104 to a desired temperature. In some examples, the heater 124 may be used for preheating of the incoming primary fuel 104. The heater 124 may be one of various types of heaters including heat exchangers that use the heat of various fluids in the system 100 to preheat the primary fuel 104. In other examples, the heater 124 may be an electric or fuel burning heater. The present disclosure is not limited to any particular type of the heater 124. The heater 124 may be used to raise a temperature of the primary fuel 104 to approximately 310° C., although other temperatures may be used depending on the fuel type of the incoming primary fuel 104. It should be noted that more than one heater 124 may be used and is considered to be within the scope of the presently disclosed subject matter.

A pilot fuel pump 126 pumps a portion of the primary fuel 104 from the primary fuel tank 106 into the pilot fuel system 120. The pilot fuel pump 126 pumps the primary fuel 104 into the heater 124. The primary fuel 104 leaving the heater 124 is reacted in the reactor 122 to form the pilot fuel, in this example DME. The output of the reactor 122, reactor product 128, includes the liquid pilot fuel 112 and the gaseous pilot fuel 114, which can include the DME, water, and unreacted primary fuel 104. The output of the reactor 122, the reactor product 128, flows into a pressure regulator 130. The pressure regulator 130 can be used to maintain a pressure that helps to liquify at least a portion of the methanol and water in the reactor product 128. Liquifying the methanol and water help to separate the methanol and water from the DME to increase the purity of the liquid pilot fuel 112 and/or the gaseous pilot fuel 114. The reactor product 128 thereafter enters a condenser 132 to reduce the temperature (and in some examples, the pressure) of the reactor product 128. The condenser 132 can be one or more types of heat exchangers designed to reduce the temperature of the reactor product 128 including, but not limited to a, shell and tube heat exchanger, tube in tube heat exchanger, direct or indirect heat exchanger, or phase change heat exchanger. It should be noted that in some examples, the methanol and water are liquified primarily in, or exclusively in, the condenser 132. Thus, in these examples, the pressure regulator 130 may not be used or installed or another means for regulating pressure in the reactor 122 may be used. The liquid pilot fuel 112 and/or the gaseous pilot fuel 114 are pumped to the storage tank 116 using product pump 134.

In some examples, a controller 136 may be used to actively manage a desired or required physical state of the pilot fuel stored in the storage tank 116, e.g., the liquid pilot fuel 112 and the gaseous pilot fuel 114. A desired or required physical state may be managed or controlled for various reasons, such as managing an amount of the pilot fuel in the storage tank 116 for engine 102 operations. For example, the storage tank 116 can act as a buffer or "make-up" tank that allows for a consistent flow of the pilot fuel stored in the storage tank 116 into the pilot fuel rail 118. For example, the engine 102 may have a sudden increase in power demand whereby additional primary fuel 104 and pilot fuel are needed to supply the increased demand from the engine 102.

In a similar manner, the engine 102 may have a sudden decrease in power demand, whereby less primary fuel 104 and pilot fuel are needed to supply the lower demand from the engine 102. In some examples, however, the pilot fuel system 120 may not be capable of an instantaneous or rapid increase or decrease of production of the pilot fuel. Thus, in order to maintain a desired combustion mixture ratio of the primary fuel 104 and the pilot fuel at the higher or lower power level, additional pilot fuel may be received from the storage tank 116. During this power demand cycle (e.g., an increase or decrease in power), the pilot fuel system 120 increases or decreases production.

Along with acting as a buffer, the pilot fuel in the storage tank 116 may also be used during a startup phase of the engine 102. While starting up the engine 102, the pilot fuel system 120 may be at a reduced temperature, whereby the efficiency of the reaction within the reactor 122 is insufficient to produce the reactor product 128. Thus, as in the situation in which an instant or rapid increase in power required by the engine 102 is met using the pilot fuel in the storage tank 116, the pilot fuel stored in the storage tank 116 prior to shutdown of the engine 102 can be used while the temperature of the reactor 122 of the pilot fuel system 120 increases to a desired operational temperature. Further, the pilot fuel in the storage tank 116 may be used during a shutdown of the engine 102. In some examples, the primary fuel 104 may need to be fully evacuated from the engine 102 prior to shut down. In some examples, during shutdown, the pilot fuel may be used in lieu of the primary fuel 104 so that, at full shutdown, there is no remaining primary fuel 104. The evacuation process may be assisted using high pressure nitrogen or inert gas (not shown).

To actively manage a desired or required physical state of the components stored in the storage tank 116, the controller 136 may include one or more control outputs to actively manage the conditions within the storage tank 116. The controls outputs can include a level output 138 to regulate a liquid level of the liquid pilot fuel 112, which may include water, DME, and methanol, in the storage tank 116, a temperature output 140 to regulate a temperature in the storage tank 116, and/or a pressure output 142 to regulate a pressure in the storage tank 116. The controller 136 may issue one or more of the level output 138, the temperature output 140, and/or the pressure output 142 based on data from one or more sensors used to monitor one or more storage conditions within the storage tank 116. These storage conditions can include, but are not limited to, a level of the liquid pilot fuel 112, a pressure in the storage tank 116, and/or a temperature within the storage tank 116. The storage conditions can be provided by one or more of a level sensor 144 that provides level data 146 of the liquid level in the storage tank 116 to the controller 136, a temperature sensor 148 that provides temperature data 150 indicating a temperature within the storage tank 116 to the controller 136 and/or a pressure sensor 152 that provides pressure data 154 indicating a pressure within the storage tank 116 to the controller 136.

The level of the liquid pilot fuel 112 in the storage tank 116 may be maintained using various means for various reasons. The controller 136 can maintain the level of the liquid pilot fuel 112 in the storage tank 116 above a certain level or within an operational range. For example, and not by way of limitation, a minimal level of the liquid pilot fuel 112 may at least be a sufficient amount of the liquid pilot fuel 112 to provide for a complete shutdown and startup of the engine 102. As noted above, during a shutdown, the liquid pilot fuel 112 may be used to allow for removal of the primary fuel 104 from the engine 102 prior to shut down. Further, as noted above, the liquid pilot fuel 112 may be used to provide a source of pilot fuel during a startup, giving the pilot fuel system 120 sufficient time to reach a desired operational temperature to begin producing the pilot fuel. The minimal level of the liquid pilot fuel 112 may also be determined by a predetermined amount of pilot fuel used when increasing power demand to a certain power increase or a certain rate (e.g., an instantaneous or relatively rapid increase in power demand). The predetermined amount may be based on a calculation of a volume of the liquid pilot fuel 112 required during an increased demand until the pilot fuel system 120 increases the production of the liquid pilot fuel 112 to meet the demand, as well as increase the level of the liquid pilot fuel 112 to make up for the extra liquid pilot fuel 112 used as a result of the increased power demand.

In this example, if the controller 136 receives the level data 146 indicating that the level as detected by the level sensor 144 is at or below a low setpoint (or below a low level of a level range), the controller 136 may issue the level output 138 to instruct the pilot fuel pump 126 to increase the flowrate of the pilot fuel pump 126. The increased flowrate of the pilot fuel pump 126 increases the production of the liquid pilot fuel 112. The controller 136 may also determine a rate of change of the level indicated by the level data 146, whereby a detection of a rate of change of the level indicated by the level data 146 above a high rate of change setpoint causes a pump control 147 of the controller 136 to change the flowrate (or speed) of the pilot fuel pump 126 to a certain flowrate. For example, an increased flowrate of the pilot fuel pump 126 is designed to maintain at least a minimum level of the liquid pilot fuel 112 in the storage tank 116. In a similar manner, if the controller 136 receives an input that the level data 146 from the level sensor 144 indicates that a level of the liquid pilot fuel 112 is at or above a high setpoint, the pump control 147 of the controller 136 instructs the pilot fuel pump 126 to decrease the flowrate of the pilot fuel pump 126. The decreased flowrate of the pilot fuel pump 126 decreases the production of the pilot fuel.

In some configurations, the controller 136 may use a change of power demand of the engine 102 to anticipate changes in the use of the liquid pilot fuel 112. In these examples, the controller 136 receives a power signal 156 from the engine 102 or some other system. The presently disclosed subject matter is not limited to the power signal 156 being received from or generated by the engine 102, as the power signal 156 may be generated by other components not shown in FIG. 1. The controller 136 receives the power signal 156 and adjusts the production of the pilot fuel by the pilot fuel system 120 accordingly. For example, if the controller 136 receives the power signal 156 indicating that the engine 102 is to produce more power, the level output 138 of the controller 136 instructs the pilot fuel pump 126 to increase the flowrate of the pilot fuel pump 126 to increase the production of the reactor product 128. In a similar manner, if the controller 136 receives the power signal 156 indicating that the engine 102 is to produce less power, the level output 138 of the controller 136 instructs the pilot fuel pump 126 to decrease the flowrate of the pilot fuel pump 126 to decrease the production of the reactor product 128. The controller 136 can still use the level data 146 to make additional adjustments to the flowrate of the pilot fuel pump 126 to maintain the level of the liquid pilot fuel 112 in the storage tank 116 within an operational range.

The controller 136 can also actively maintain a temperature within the storage tank 116 within a predetermined temperature range for various reasons such as, but not limited to, maintaining a pressure within the storage tank 116. In this example, the temperature range may be used to control the pressure of the gaseous pilot fuel 114 within the storage tank 116, thus maintaining the pressure data 154 within a predetermined pressure range. As the temperature of the liquid pilot fuel 112 rises, the vapor pressure of the DME within the liquid pilot fuel 112 increases, thus increasing the pressure within the storage tank 116 from the increased pressure of the gaseous pilot fuel 114. The controller 136 can also actively maintain a temperature within the storage tank 116 to keep or maintain a temperature of the liquid pilot fuel 112 and/or the gaseous pilot fuel 114 within a desired operational range suitable for use by the engine 102. For example, an increased temperature of the liquid pilot fuel 112 may cause the liquid pilot fuel 112 to more readily be vaporized or ignited in the engine 102.

To maintain a temperature in the storage tank 116 within a predetermined range, a storage tank heater 158 can be used. The storage tank heater 158 may be one of various types of heaters including, but not limited to, a heat exchanger that use the heat of various fluids in the system 100 to heat the liquid pilot fuel 112. In other examples, the storage tank heater 158 may be an electric or fuel burning heater. The present disclosure is not limited to any particular type of the storage tank heater 158. The storage tank heater 158 may be used to maintain the liquid pilot fuel 112 within a predetermined temperature range. It should be further noted that more than one storage tank heater 158 may be used and is considered to be within the scope of the presently disclosed subject matter. The controller 136 receives the temperature data 150 and determines if the temperature of the liquid pilot fuel 112 is to be increased or decreased. If the temperature of the liquid pilot fuel 112 is below the range, the controller 136 issues the temperature output 140 to cause the storage tank heater 158 to increase the temperature. Similarly, if the temperature of the liquid pilot fuel 112 is above the range, the controller 136 issues the temperature output 140 to cause the storage tank heater 158 to cease heating the liquid pilot fuel 112. In some examples, the storage tank heater 158 may be part of system that includes a cooling module, whereby the cooling module cools the liquid pilot fuel 112.

The controller 136 may use various methods to maintain the pressure in the storage tank 116 within a desired pressure range. An example was provided above whereby the controller 136 maintains the pressure in the storage tank 116 by increasing or decreasing the temperature of the liquid pilot fuel 112. Another method may be to use a storage tank pressure regulator 160. The storage tank pressure regulator 160 may be a valve controllable by the pressure output 142 of the controller 136. In some examples, the storage tank pressure regulator 160 has multiple positions that, when controlled by the controller 136, maintains a pressure in a feed line 166. In other examples, the storage tank pressure regulator 160 is a pressure relief valve that, when a predetermined pressure setpoint is reached, vents a portion of the gaseous pilot fuel 114 either into the atmosphere or another tank (not shown). In some examples, the controller 136 may use the storage tank heater 158 to maintain a pressure within the storage tank 116 and the storage tank pressure regulator 160 to maintain a pressure in the feed line 166 that provides the pilot fuel 112/114 to the engine 102. In some examples, either in addition to, or in lieu of, using the storage tank pressure regulator 160, a pressure pump or other pressurized source may be used to introduce a pressurized fluid into the storage tank 116 to increase the pressure within the storage tank 116.

Using the storage tank pressure regulator 160, the controller 136 may use the pressure within the storage tank 116 to change the amount of the gaseous pilot fuel 114 in the storage tank 116 without changing the temperature of the liquid pilot fuel 112. For example, if the pressure within the storage tank 116 is increased, an increased amount of the gaseous pilot fuel 114 will move from the gaseous phase into the liquid phase of the liquid pilot fuel 112. In a similar manner, if the pressure within the storage tank 116 is decreased, an increased amount of the liquid pilot fuel 112 will move from the liquid phase and into the gaseous phase of the gaseous pilot fuel 114. The controller 136 may also maintain the pressure within the storage tank 116 to ensure a flow rate of the gaseous pilot fuel 114 and/or the liquid pilot fuel 112 into the engine 102.

Figure 2:
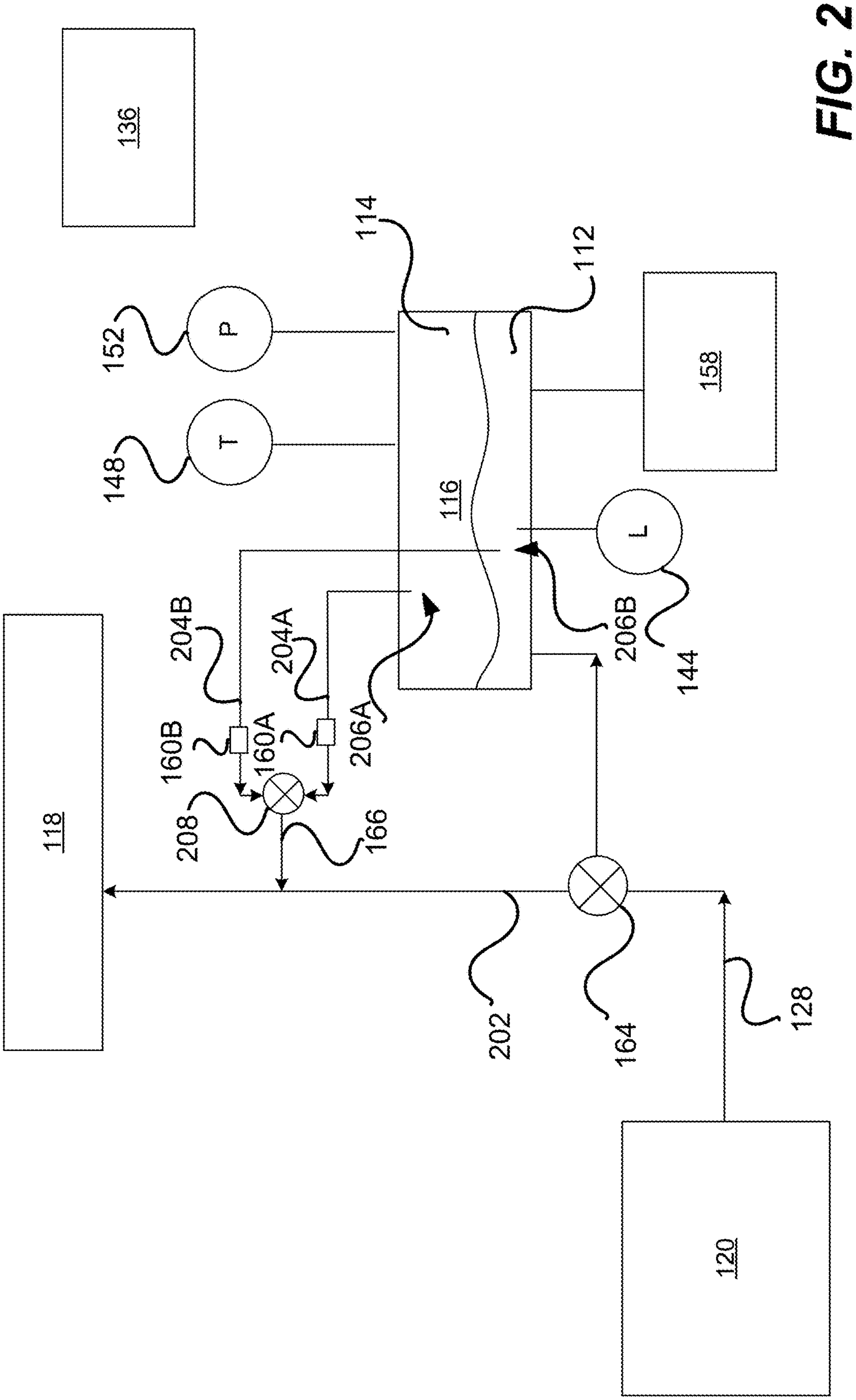
FIG. 2 is a partial schematic illustration of a system in which the active control of a storage tank can be used to selectively provide a liquid pilot fuel and/or a gaseous pilot fuel to an engine through a pilot fuel rail, according to various examples of the presently disclosed subject matter.

The controller 136 is also used to control one or more valves that may be used in the system 100 to introduce the reactor product 128 into the storage tank 116. For example, the controller 136 includes a valve control 162. The valve control 162 is a command issued by the controller 136 to change a position of a storage tank valve 164. In some examples, the storage tank valve 164 may be a solenoid operated valve in which the position of the storage tank valve 164 increases, decreases, or stops the flow of the reactor products 128 (i.e., the liquid pilot fuel 112 and/or the gaseous pilot fuel 114) into the storage tank 116 to maintain the level of the liquid pilot fuel 112 within a predetermined range. As explained above, in one example, if the controller 136 receives the level data 146 indicating that the level as detected by the level sensor 144 is at or below a low setpoint, the controller 136 may issue the level output 138 to instruct the pilot fuel pump 126 to increase the flowrate of the pilot fuel pump 126. In another example, if the controller 136 receives the level data 146 indicating that the level as detected by the level sensor 144 is at or below a low setpoint, in addition to, or in lieu of, instructing the pilot fuel pump 126 to increase the flowrate of the pilot fuel pump 126, the controller 136 may also issue the valve control 162 to cause the storage tank valve 164 to open more, allowing more of the reactor product 128 to enter the storage tank 116. FIG. 2 illustrates other examples of how the controller 136 can control the introduction of the liquid pilot fuel 112 and/or the gaseous pilot fuel 114 into the pilot fuel rail 118 of the engine 102 through the feed line 166.

FIG. 2 is a partial schematic illustration of the system 100 in which the active control of the storage tank 116 can be used to selectively provide the liquid pilot fuel 112 and/or the gaseous pilot fuel 114 to the engine 102 through the pilot fuel rail 118, according to various examples of the presently disclosed subject matter. In FIG. 2, the reactor product 128 is produced using the pilot fuel system 120, as explained by way of example in FIG. 1. The reactor product 128 can be received by the engine 102 directly from the pilot fuel system 120 through pilot fuel input 202 into the pilot fuel rail 118 and/or be received into the storage tank 116 depending on the position of the storage tank valve 164. As discussed above, the controller 136 of FIG. 1 controls the level of the liquid pilot fuel 112 using various technologies, including changing the position of the storage tank valve 164, increasing/decreasing the production of the reactor product 128, the heater 158 to either increase or decrease the temperature of the liquid pilot fuel 112 to change the thermodynamic state within the storage tank 116. In the example illustrated in FIG. 2, the feed line 166 is configured to receive the liquid pilot fuel 112, the gaseous pilot fuel 114, or a mixture of the liquid pilot fuel 112 and the gaseous pilot fuel 114. Changing the thermodynamic stage of the liquid pilot fuel 112 can change the amount of pilot fuel 112/114 is either in the liquid phase as the liquid pilot fuel 112 or in the gaseous phase as the gaseous pilot fuel 114. The phase change of the pilot fuel 112/114 between the gaseous phase and the liquid phase can also change the level of the liquid pilot fuel 112.

In some examples, it may be desirable to introduce either the liquid pilot fuel 112, the gaseous pilot fuel 114, or a combination of the liquid pilot fuel 112 and the gaseous pilot fuel 114 in the pilot fuel rail 118 for use by the engine 102. In these examples, the feed line 166 of FIG. 1 may be fed using a dual feed line. In FIG. 2, a gaseous pilot fuel feed line 204A has a feed input 206A preferably placed within the storage tank 116 at a height and location within the storage tank 116 that preferably receives the gaseous pilot fuel 114. The gaseous pilot fuel 114 exits the storage tank 116 through the gaseous pilot fuel feed line 204A and enters a gas pressure regulator 160A that maintains a pressure of the gaseous pilot fuel 114 entering the feed line 166. A liquid pilot fuel feed line 204B has a feed input 206B preferably placed within the storage tank 116 at a height and location within the storage tank 116 that preferably receives the liquid pilot fuel 112. The liquid pilot fuel 112 exits the storage tank 116 through the liquid pilot fuel feed line 204B and enters a liquid pressure regulator 160B that maintains a pressure of the liquid pilot fuel 112 entering the feed line 166. In some examples, either in lieu of or in combination with the use of the gas pressure regulator 160A and/or the liquid pressure regulator 160B, a pressure regulator may be used at the feed line 166. In the aforementioned configuration, the controller 136 can use the level data 146 to maintain the feed input 206B within the liquid pilot fuel 112 so that the feed input 206B receives primarily or only the liquid pilot fuel 112 into the feed input 206B. In a similar manner, the controller 136 can use the level data 146 to maintain the feed input 206A within the gaseous pilot fuel 114 so that the feed input 206A receives primarily or only the gaseous pilot fuel 114 into the feed input 206A.

Figure 3:
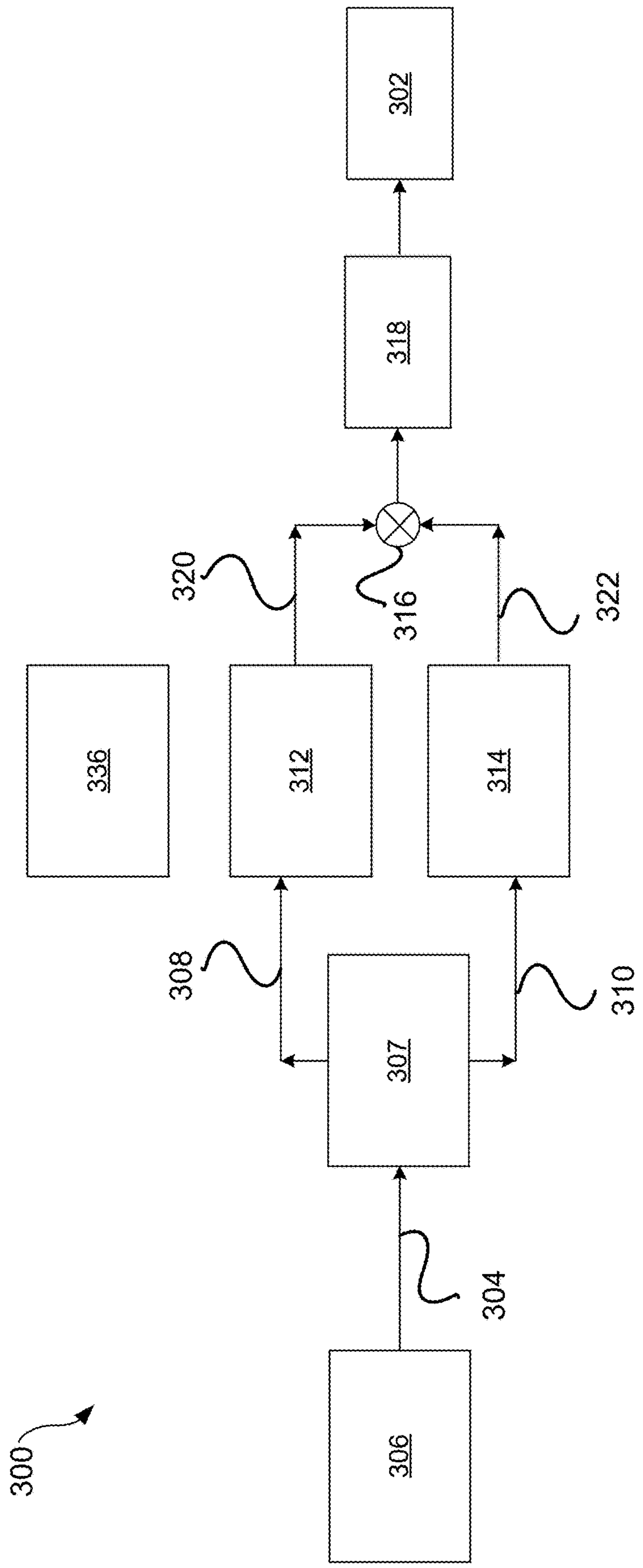
FIG. 3 is a schematic illustration of a system in which a storage tank and a separator are actively controlled to selectively provide a purified pilot fuel and an unpurified pilot fuel to an engine, according to various examples of the presently disclosed subject matter.

The controller 136 uses a pilot feed valve 208 to selectively introduce either the liquid pilot fuel 112, the gaseous pilot fuel 114, or various ratios of the liquid pilot fuel 112 and the gaseous pilot fuel 114 in the pilot fuel rail 118 for use by the engine 102. The pilot feed valve 208 can be placed in a first position that receives only the liquid pilot fuel 112 through the liquid pilot fuel feed line 204B, in a second position that receives only the gaseous pilot fuel 114 through the gaseous pilot fuel feed line 204A, in a third position that closes the pilot feed valve 208 to prevent both the liquid pilot fuel 112 and the gaseous pilot fuel 114 from entering the pilot fuel rail 118, or in a plurality of fourth positions between the first position and the second position that allows various ratios of the liquid pilot fuel 112 to the gaseous pilot fuel 114 (i.e., a combination of the liquid pilot fuel 112 and the gaseous pilot fuel 114) depending on the position of the pilot feed valve 208. FIG. 3 illustrates an additional example in which the liquid pilot fuel 112 and the gaseous pilot fuel 114 can be selectively introduced into the engine 102.

FIG. 3 is a schematic illustration of a system 300 in which the storage tank 116 and a separator are actively controlled to selectively provide a purified pilot fuel and an unpurified pilot fuel to an engine 302, according to various examples of the presently disclosed subject matter. In FIG. 3, the engine 302 is an internal combustion engine fueled by a reactor product 304 produced by a pilot fuel system 306. The pilot fuel system 306 produces the reactor product 304 in a manner as described with respect to the pilot fuel system 120 of FIG. 1. Depending on the configuration of the pilot fuel system 306, the reactor product 304 includes DME, water, and unreacted methanol if methanol is used as the input to the pilot fuel system 306. The reactor product 304 can be primarily a liquid, a gas, or a combination of a liquid and gas.

The reactor product 304 enters a separator 307. In some examples, the separator 307 is configured to separate a portion of the DME in the reactor product 304, leaving an unpurified portion of the reactor product 304 comprising remaining DME, water, and unreacted methanol. In some examples, the separator 307 uses thermal energy to cause the DME in the reactor product 304 to evaporate out of the reactor product 304, as the DME has a very high relative volatility compared to methanol and water. Other technologies for DME separation may be used and are considered to be within the scope of the presently disclosed subject matter. The separated DME exits the separator 307 through DME product line 308, whereby the remaining reactor product 304 not separated in the separator 307 exits the separator 307 through blended product line 310. In some examples, the separated DME exiting through the DME product line 308 and/or the remaining reactor product 304 exiting through blended product line 310 may be gaseous, liquid, or a combination of gas and liquid.

The separated DME exiting through the DME product line 308 enters a purified tank 312. The purified tank 312 is configured to store the purified DME as a liquid, gas, or a combination of a liquid and gas. In some examples, the temperature and pressure in the purified tank 312 may be actively controlled by the controller 136 in a manner similar to the processes described in FIGS. 1 and 2. The remaining reactor product 304 exiting through the blended product line 310 enters a blended product tank 314. The blended product tank 314 is configured to store the unseparated DME, water, and/or methanol as a liquid, gas, or a combination of a liquid and gas. In some examples, the temperature and pressure in the blended product tank 314 may be actively controlled by the controller 136 in a manner similar to the processes described in FIGS. 1 and 2.

Figure 4:
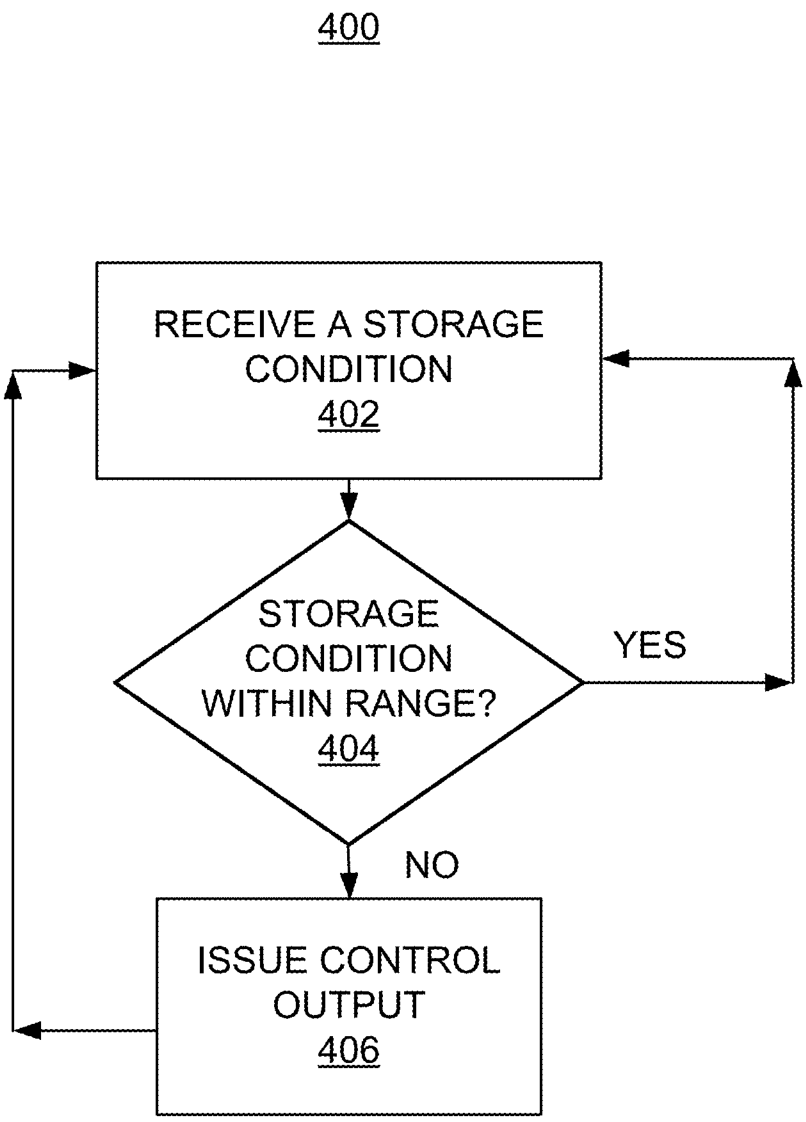
FIG. 4 illustrates a method for actively managing one or more storage tanks used to store dimethyl ether, in accordance with various examples of the presently disclosed subject matter.

A controller 336 can control a blend valve 316 to provide the remaining reactor product 304 stored in the blended product tank 314, the separated DME stored in the purified tank 312, or a mixture having ratios of both to a pilot fuel header 318 of the engine 302. The blend valve 316 can be placed by the controller 336 in a first position that receives only purified tank 312 through a purified feed line 320, in a second position that receives only the remaining reactor product 304 stored in the blended product tank 314 through blended feed line 322, in a third position that closes the blend valve 316, or in a plurality of fourth positions between the first position and the second position that allows various percentages of the remaining reactor product 304 stored in the blended product tank 314 and the purified DME depending on the position of the blend valve 316. FIG. 4 is an example method describing how a controller, like the controller 136 of FIG. 1 or the controller 336 of FIG. 3 can actively manage the conditions within one or more tanks storing DME, such as the storage tank 116 of FIG. 1 or storage tanks like the purified tank 312 or the blended product tank 314 of FIG. 3.

FIG. 4 illustrates a method 400 for actively managing one or more pilot fuel storage tanks used to store dimethyl ether, in accordance with various examples of the presently disclosed subject matter. Examples of the pilot fuel storage tanks include, but are not limited to, the storage tank 116 of FIG. 1, or the purified tank 312 of FIG. 3, and/or the blended product tank 314 of FIG. 3. The method 400 and other processes described herein are illustrated as example flow graphs, each operation of which may represent a sequence of operations that can be implemented in hardware, software, or a combination thereof. In the context of software, the operations represent computer-executable instructions stored on one or more tangible computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The method 400 can be implemented or controlled by a controller, such as the controller 136 of FIG. 1 or the controller 336 of FIG. 3. The controller 136 of FIG. 1 or the controller 336 of FIG. 3 may be comprised of hardware, software, or various combinations thereof, described by way of example in FIG. 5.

The method 400 commences at step 402, where the controller 136 is monitoring the DME storage tanks and receives a storage condition indicating a condition within the DME storage tank(s). In some examples, the DME storage tanks can include examples such as the storage tank 116 of FIG. 1 or the purified tank 312 and the blended product tank 314 of FIG. 3. The DME storage tanks can store DME produced by a pilot fuel system, such as the pilot fuel system 120 of FIG. 1, from a fuel such as the primary fuel 104. It should be noted that although the description herein discusses the pilot fuel as being DME, other types of pilot fuels are considered to be within the scope of the present disclosure.

The storage conditions can include, but are not limited to, a level of the liquid pilot fuel 112, a pressure in the storage tank, and/or a temperature within the storage tank 116. The storage conditions can be provided by one or more of a level sensor 144 that provides level data 146 of the liquid level in the storage tank 116 to the controller 136, a temperature sensor 148 that provides temperature data 150 indicating a temperature within the storage tank 116 to the controller 136 and/or a pressure sensor 152 that provides pressure data 154 indicating a pressure within the storage tank 116 to the controller 136. It should be understood that the controller 136 may receive more than one type of storage condition contemporaneously or at periodic intervals depending on the particular configuration and capabilities of the controller 136.

At step 404, the controller 136 determines if the storage condition is within a predetermined range for the received storage condition. For example, the range may be a temperature range, a pressure range, and/or a level range. If at step 406 the controller 136 determines that the storage condition is within the predetermined range, the method continues to step 402, where the controller 136 continues to monitor the storage tank(s).

If at step 404 the controller 136 determines that the storage condition is not within the predetermined range, at step 406, the controller 136 issues a control output to bring the storage condition back to within the predetermined range. The controls outputs can include a level output 138 to regulate a liquid level of the liquid pilot fuel 112, which may include water, DME, and methanol, in the storage tank 116, a temperature output 140 to regulate a temperature in the storage tank 116, and/or a pressure output 142 to regulate a pressure in the storage tank 116. Examples of how the controller 136 may use the control outputs are described in FIG. 1, above.

The controller 136 continues to monitor the storage condition at step 402 and at step 404, the controller 136 determines if the storage condition is within a range to determine if the control output issued at step 406 is to be changed.

Figure 5:
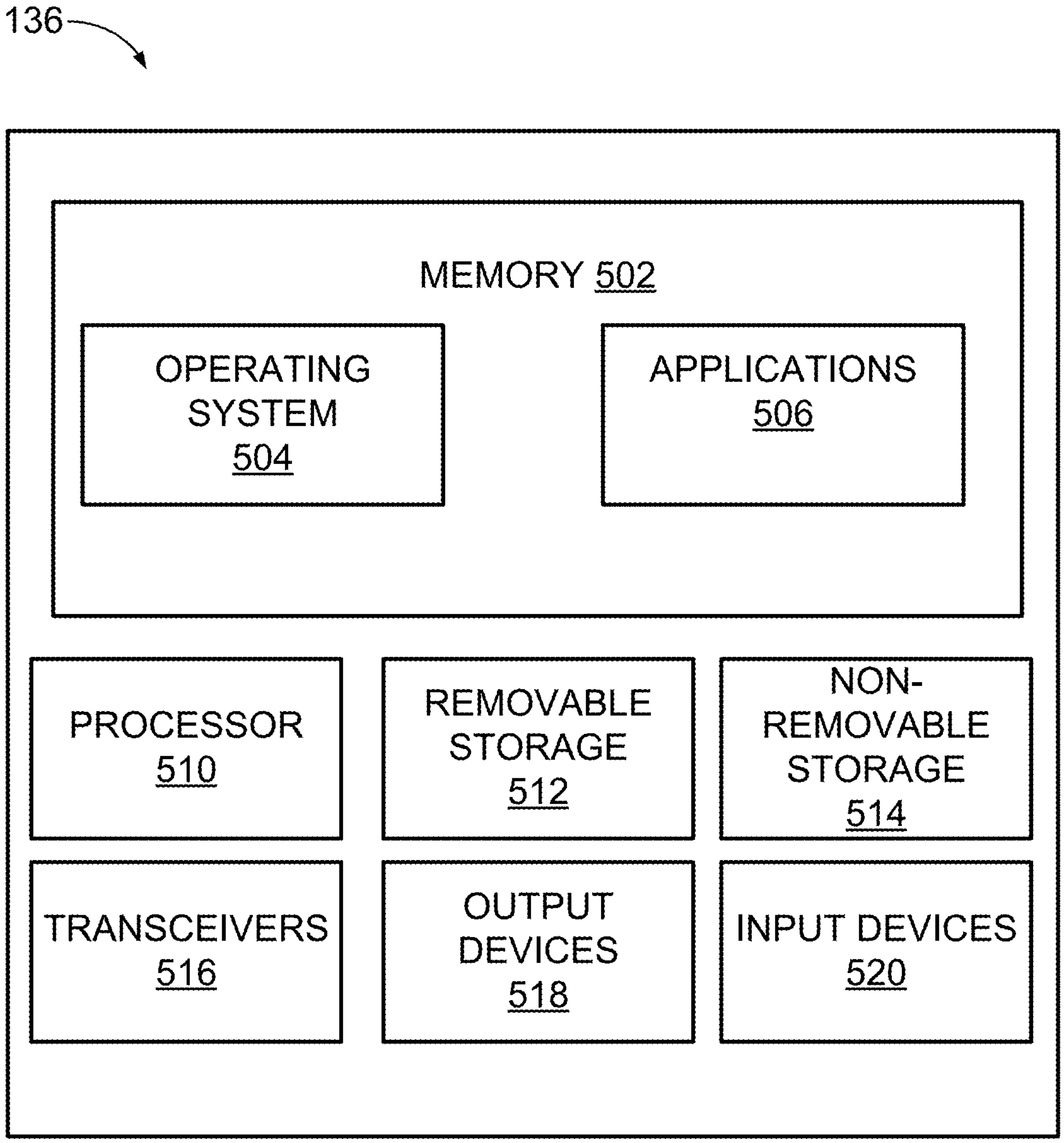
FIG. 5 depicts a component level view of a controller for use with the systems and methods described herein, in accordance with various examples of the presently disclosed subject matter.

FIG. 5 depicts a component level view of the controller 136 for use with the systems and methods described herein, in accordance with various examples of the presently disclosed subject matter. Although FIG. 5 is described using the controller 136, the controller 336 may also include the components described in FIG. 5 and operate in a similar manner. The controller 136 could be any device capable of providing the functionality associated with the systems and methods described herein. The controller 136 can comprise several components to execute the above-mentioned functions. The controller 136 may be comprised of hardware, software, or various combinations thereof. As discussed below, the controller 136 can comprise memory 502 including an operating system (OS) 504 and one or more applications 506. The applications 506 may include applications that provide for the level output 138, the temperature output 140, the pressure output 142, and/or the valve control 162, as well as implement one or more steps of the method 400 described above.

The controller 136 can also comprise one or more processors 510 and one or more of removable storage 512, non-removable storage 514, transceiver(s) 516, output device(s) 518, and input device(s) 520. In various implementations, the memory 502 can be volatile (such as random access memory (RAM)), non-volatile (such as read only memory (ROM), flash memory, etc.), or some combination of the two. The memory 502 can include data pertaining to signals level data 146, the temperature data 150, and/or the pressure data 154, and other information, and can be stored on a remote server or a cloud of servers accessible by the controller 136.

The memory 502 can also include the OS 504. The OS 504 varies depending on the manufacturer of the controller 136. The OS 504 contains the modules and software that support basic functions of the controller 136, such as scheduling tasks, executing applications, and controlling peripherals and valves. The OS 504 can also enable the controller 136 to send and retrieve other data and perform other functions.

In some implementations, the processor(s) 510 can be one or more central processing units (CPUs), graphics processing units (GPUs), both CPU and GPU, or any other combinations and numbers of processing units. The controller 136 may also include additional data storage devices (removable and/or non-removable) such as, for example, magnetic disks, optical disks, or tape. Such additional storage is illustrated in FIG. 5 by removable storage 512 and non-removable storage 514.

Non-transitory computer-readable media may include volatile and nonvolatile, removable and non-removable tangible, physical media implemented in technology for storage of information, such as computer readable instructions, data structures, program modules, or other data. The memory 502, removable storage 512, and non-removable storage 514 are all examples of non-transitory computer-readable media. Non-transitory computer-readable media include, but are not limited to, RAM, ROM, electronically erasable programmable ROM (EEPROM), flash memory or other memory technology, compact disc ROM (CD-ROM), digital versatile discs (DVD) or other optical storage, magnetic cassettes, magnetic tape, magnetic disk storage or other magnetic storage devices, or any other tangible, physical medium which can be used to store the desired information, which can be accessed by the controller 136. Any such non-transitory computer-readable media may be part of the controller 136 or may be a separate database, databank, remote server, or cloud-based server.

In some implementations, the transceiver(s) 516 include any transceivers known in the art. In some examples, the transceiver(s) 516 can include wireless modem(s) to facilitate wireless connectivity with other components (e.g., between the controller 136 and one or more pumps or valves), the Internet, and/or an intranet. Specifically, the transceiver(s) 516 can include one or more transceivers that can enable the controller 136 to send and receive data. Thus, the transceiver(s) 516 can include multiple single-channel transceivers or a multi-frequency, multi-channel transceiver to enable the controller 136 to send and receive video calls, audio calls, messaging, etc. The transceiver(s) 516 can enable the controller 136 to connect to multiple networks including, but not limited to 2G, 3G, 4G, 5G, and Wi-Fi networks. The transceiver(s) 516 can also include one or more transceivers to enable the controller 136 to connect to future (e.g., 6G) networks, Internet-of-Things (IoT), machine-to machine (M2M), and other current and future networks.

The transceiver(s) 516 may also include one or more radio transceivers that perform the function of transmitting and receiving radio frequency communications via an antenna (e.g., Wi-Fi or Bluetooth®). In other examples, the transceiver(s) 516 may include wired communication components, such as a wired modem or Ethernet port, for communicating via one or more wired networks. The transceiver(s) 516 can enable the controller 136 to facilitate audio and video calls, download files, access web applications, and provide other communications associated with the systems and methods, described above.

In some implementations, the output device(s) 518 include any output devices known in the art, such as a display (e.g., a liquid crystal or thin-film transistor (TFT) display), a touchscreen, speakers, a vibrating mechanism, or a tactile feedback mechanism. Thus, the output device(s) can include a screen or display. The output device(s) 518 can also include speakers, or similar devices, to play sounds or ringtones when an audio call or video call is received. Output device(s) 518 can also include ports for one or more peripheral devices, such as headphones, peripheral speakers, or a peripheral display.

In various implementations, input device(s) 520 include any input devices known in the art. For example, the input device(s) 520 may include a camera, a microphone, or a keyboard/keypad. The input device(s) 520 can include a touch-sensitive display or a keyboard to enable users to enter data and make requests and receive responses via web applications (e.g., in a web browser), make audio and video calls, and use the applications 506, among other things. A touch-sensitive display or keyboard/keypad may be a standard push button alphanumeric multi-key keyboard (such as a conventional QWERTY keyboard), virtual controls on a touchscreen, or one or more other types of keys or buttons, and may also include a joystick, wheel, and/or designated navigation buttons, or the like. A touch sensitive display can act as both an input device 520 and an output device 518.

INDUSTRIAL APPLICABILITY

The present disclosure relates generally to internal combustion engines that use a pilot fuel to assist with the ignition of a primary fuel. The systems 100 and 300 illustrated in FIGS. 1-3 use the primary fuel 104 as the source for the liquid pilot fuel 112 and the gaseous pilot fuel 114 stored in one or more storage tanks, such as the storage tank 116 of FIG. 1 or storage tanks like the purified tank 312 or the blended product tank 314 of FIG. 3. To maintain a desired physical state of the stored DME, the storage tanks are monitored and actively managed using various means, such as heating the storage tanks, pressurizing the storage tanks, and/or changing the production of the pilot fuel to change the level of the liquid pilot fuel 112 stored in the storage tank. In order to preferentially draw liquid pilot fuel or gaseous (vapor) pilot fuel from the tank, the connection to the tank can be at the top or bottom (or both) of the tank, described by way of example in FIG. 2 through the use of the feed input 206A that is preferably placed within the storage tank 116 at a height and location within the storage tank 116 that preferably receives the gaseous pilot fuel 114 and the feed input 206B that is preferably placed within the storage tank 116 at a height and location within the storage tank 116 that preferably receives the liquid pilot fuel 112. The ratio of fuel drawn from the two connections can be controlled using the pilot feed valve 208 to selectively introduce either the liquid pilot fuel 112, the gaseous pilot fuel 114, or a combination of the liquid pilot fuel 112 and the gaseous pilot fuel 114 in the pilot fuel rail 118 for use by the engine 102. The use of multiple storage tanks can be coupled with differentiated compositions for the streams entering the tanks described by way of example as the purified tank 312 and the blended product tank 314 of FIG. 3. Storing only pure DME in one tank could reduce the tank condition management needs in order to have the fuel in that tank ready for a subsequent engine start. Separating pure DME for storage in the purified tank 312 and storing the blended (DME, water, methanol) mixture in the blended product tank 314 can enable combustion control by a selective blending of fuel from both tanks using the blend valve 316 to achieve a desired mixture composition.

Unless explicitly excluded, the use of the singular to describe a component, structure, or operation does not exclude the use of plural such components, structures, or operations or their equivalents. As used herein, the word “or” refers to any possible permutation of a set of items. For example, the phrase “A, B, or C” refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system comprising:

an internal combustion engine that consumes a primary fuel and a pilot fuel;

a primary fuel tank providing the primary fuel to a primary fuel rail for use by the internal combustion engine;

a pilot fuel system configured to generate the pilot fuel from the primary fuel, the pilot fuel system including:

a reactor that receives the primary fuel, the reactor configured to convert the primary fuel from an alcohol to an ether, wherein a product of the reactor comprises the pilot fuel, unreacted primary fuel, and water; and a product pump that receives the pilot fuel from the reactor and pumps the pilot fuel into the internal combustion engine or one or more pilot fuel storage tanks for use by the internal combustion engine;

a gaseous pilot fuel feed line comprising a first feed input located within the one or more pilot fuel storage tanks at a location that preferably receives a gaseous portion of the pilot fuel stored in the one or more pilot fuel storage tanks;

a liquid pilot fuel feed line comprising a second feed input located within the one or more pilot fuel storage tanks at a location that preferably receives a liquid portion of the pilot fuel stored in the one or more pilot fuel storage tanks;

a pilot feed valve configured to receive the gaseous portion of the pilot fuel, the liquid portion of the pilot fuel, or a combination of the gaseous portion of the pilot fuel and the liquid portion of the pilot fuel; and a controller configured to actively manage a physical state of the pilot fuel stored in the one or more pilot fuel storage tanks, the controller comprising:

a memory storing computer-executable instructions; and a processor in communication with the memory, the computer-executable instructions causing the processor to perform acts comprising:

receiving a storage condition of the one or more pilot fuel storage tanks;

determining if the storage condition of the one or more pilot fuel storage tanks is within a range; and upon determining that the storage condition is not within the range, issuing a control output to bring the storage condition to within the range.

2. The system of claim 1, wherein the primary fuel comprises methanol and the pilot fuel comprises dimethyl ether.

3. The system of claim 1, wherein the storage condition comprises a level of a liquid portion of the pilot fuel stored in the one or more pilot fuel storage tanks, and wherein the control output comprises an instruction to instruct a pilot fuel pump to increase a flowrate of the pilot fuel pump to increase a production of the pilot fuel by the reactor of the pilot fuel system.

4. The system of claim 1, wherein the storage condition comprises a level of a liquid portion of the pilot fuel stored in the one or more pilot fuel storage tanks, and wherein the control output comprises an instruction to instruct a storage tank pressure regulator to change a pressure of the one or more pilot fuel storage tanks to change an amount of the pilot fuel condensed into a liquid in the one or more pilot fuel storage tanks.

5. The system of claim 1, wherein the storage condition comprises a temperature of a liquid portion of the pilot fuel stored in the one or more pilot fuel storage tanks, and wherein the control output comprises an instruction to instruct a heater to change the temperature of the liquid portion of the pilot fuel stored in the one more pilot fuel storage tanks.

6. The system of claim 1, wherein the storage condition comprises a pressure in the one or more pilot fuel storage tanks, and wherein the control output comprises an instruction to instruct a heater to change a temperature of a liquid portion of the pilot fuel stored in the one more pilot fuel storage tanks to cause a change in a vapor pressure of the liquid portion of the pilot fuel stored in the one or more pilot fuel storage tanks.

7. The system of claim 1, wherein the one or more pilot fuel storage tanks comprises a purified tank configured to store a purified pilot fuel and a blended product tank configured to store a blend comprising the pilot fuel, water, and unreacted primary fuel.

8. The system of claim 7, further comprising a blend valve configured to receive the purified pilot fuel from the purified tank, the blend of the pilot fuel, water, and the blend from the blended product tank, or a combination of the purified pilot fuel and the blend.

9. A system for actively managing a physical state of a pilot fuel for an internal combustion engine, the pilot fuel produced in a reactor from a primary fuel used for the internal combustion engine, the system comprising:

a gaseous pilot fuel feed line comprising a first feed input located within one or more pilot fuel storage tanks at a location that preferably receives a gaseous portion of the pilot fuel stored in the one or more pilot fuel storage tanks;

a liquid pilot fuel feed line comprising a second feed input located within the one or more pilot fuel storage tanks at a location that preferably receives a liquid portion of the pilot fuel stored in the one or more pilot fuel storage tanks; and a pilot feed valve configured to receive the gaseous portion of the pilot fuel, the liquid portion of the pilot fuel, or a combination of the gaseous portion of the pilot fuel and the liquid portion of the pilot fuel; and a controller, the controller comprising:

a memory storing computer-executable instructions; and a processor in communication with the memory, the computer-executable instructions causing the processor to perform acts comprising:

receiving a storage condition of the one or more pilot fuel storage tanks used to store the pilot fuel, wherein the storage condition comprises a pressure in the one or more pilot fuel storage tanks, and wherein a control output comprises an instruction to instruct a heater to change a temperature of a liquid portion of the pilot fuel stored in the one or more pilot fuel storage tanks;

determining if the storage condition of the one or more pilot fuel storage tanks is within a range; and upon determining that the storage condition is not within the range, providing the control output to the heater to bring the storage condition to within the range.

10. The system of claim 9, wherein the primary fuel comprises methanol and the pilot fuel comprises dimethyl ether.

11. The system of claim 9, wherein the storage condition further comprises a level of a liquid portion of the pilot fuel stored in the one or more pilot fuel storage tanks, and wherein the control output comprises an instruction to instruct a pilot fuel pump to increase a flowrate of the pilot fuel pump to increase a production of the pilot fuel by the reactor of a pilot fuel system.

12. The system of claim 9, wherein the storage condition further comprises a level of a liquid portion of the pilot fuel stored in the one or more pilot fuel storage tanks, and wherein the control output comprises an instruction to instruct a storage tank pressure regulator to change a pressure of the one or more pilot fuel storage tanks to change an amount of the pilot fuel condensed into a liquid in the one or more pilot fuel storage tanks.

13. The system of claim 9, wherein the storage condition further comprises a temperature of a liquid portion of the pilot fuel stored in the one or more pilot fuel storage tanks, and wherein the control output comprises an instruction to instruct a heater to change the temperature of the liquid portion of the pilot fuel stored in the one or more pilot fuel storage tanks.

14. The system of claim 9, wherein the one or more pilot fuel storage tanks comprises a purified tank configured to store a purified pilot fuel and a blended product tank configured to store a blend comprising the pilot fuel, water, and unreacted primary fuel.

15. The system of claim 14, further comprising a blend valve configured to receive the purified pilot fuel from the purified tank, the blend of the pilot fuel, water, and the blend from the blended product tank, or a combination of the purified pilot fuel and the blend.

16. A method for actively managing a physical state of a pilot fuel for use by an internal combustion engine, the method comprising:

receiving a storage condition of one or more pilot fuel storage tanks used to store the pilot fuel, wherein the storage condition comprises a pressure in the one or more pilot fuel storage tanks, and wherein a control output comprises an instruction to instruct a heater to change a temperature of a liquid portion of the pilot fuel stored in the one or more pilot fuel storage tanks, and wherein the storage condition further comprises;

a level of a liquid portion of the pilot fuel stored in the one or more pilot fuel storage tanks, and further comprising instructing a pilot fuel pump to increase a flowrate of the pilot fuel pump to increase a production of the pilot fuel by a reactor of a pilot fuel system used to produce the pilot fuel from a primary fuel;

a level of a liquid portion of the pilot fuel stored in the one or more pilot fuel storage tanks, and further comprising instructing a storage tank pressure regulator to change a pressure of the one or more pilot fuel storage tanks to change an amount of the pilot fuel condensed into a liquid in the one or more pilot fuel storage tanks;

a temperature of a liquid portion of the pilot fuel stored in the one or more pilot fuel storage tanks, and further comprising instructing a heater to change the temperature of the liquid portion of the pilot fuel stored in the one more pilot fuel storage tanks;

determining if the storage condition of the one or more pilot fuel storage tanks is within a range; and upon determining that the storage condition is not within the range, providing the control output to the heater to bring the storage condition to within the range.

* * * * *